(12) United States Patent
Obayashi et al.

(10) Patent No.: US 8,939,496 B2
(45) Date of Patent: Jan. 27, 2015

(54) VEHICLE STRUCTURE

(71) Applicant: Mazda Motor Corporation, Hiroshima (JP)

(72) Inventors: Akihiro Obayashi, Higashihiroshima (JP); Masanori Fukuda, Hiroshima (JP); Ryohei Miyahara, Hiroshima (JP); Tomoshi Mitsunari, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/969,377

(22) Filed: Aug. 16, 2013

(65) Prior Publication Data

US 2014/0091593 A1   Apr. 3, 2014

(30) Foreign Application Priority Data

Sep. 28, 2012   (JP) ................................. 2012-215665

(51) Int. Cl.
*B60N 3/06* (2006.01)
*B62D 25/08* (2006.01)
*B62D 21/15* (2006.01)

(52) U.S. Cl.
CPC .............. *B62D 25/08* (2013.01); *B62D 21/152* (2013.01); *B62D 25/082* (2013.01)
USPC ....................................... 296/187.08; 296/75

(58) Field of Classification Search
CPC ........................................................ B60N 3/06
USPC ................. 296/187.08, 75, 198, 193.07, 204; 74/564; 280/748, 751
See application file for complete search history.

(56) References Cited

U.S. PATENT DOCUMENTS

| 4,804,222 | A | * | 2/1989 | Sakiyama et al. | ........ | 296/203.02 |
| 5,011,201 | A | * | 4/1991 | Takahashi et al. | ........ | 296/203.02 |
| 5,560,674 | A | * | 10/1996 | Tazaki et al. | ............. | 296/193.01 |
| 5,562,329 | A | * | 10/1996 | Srock et al. | ............. | 296/203.01 |
| 6,318,786 | B1 | * | 11/2001 | Sauve et al. | ..................... | 296/75 |
| 6,364,401 | B1 | * | 4/2002 | Kim | ......................... | 296/203.02 |
| 6,679,546 | B2 | * | 1/2004 | Mishima et al. | ......... | 296/203.01 |
| 7,059,667 | B2 | * | 6/2006 | Tomita | ..................... | 296/203.03 |
| 7,163,259 | B2 | * | 1/2007 | Hayashi | ........................ | 296/204 |
| 7,243,981 | B2 | * | 7/2007 | Park et al. | ................. | 296/187.08 |
| 7,832,795 | B2 | * | 11/2010 | Yokoi et al. | .................... | 296/204 |
| 7,862,108 | B2 | * | 1/2011 | Tamakoshi | ................ | 296/203.03 |
| 7,967,358 | B2 | * | 6/2011 | Shukuri et al. | ................... | 296/75 |
| 8,075,047 | B2 | * | 12/2011 | Yamada et al. | ........... | 296/193.09 |
| 8,469,442 | B1 | * | 6/2013 | Pencak et al. | ............. | 296/187.12 |

(Continued)

FOREIGN PATENT DOCUMENTS

JP        2006-082671 A       3/2006

*Primary Examiner* — Gregory Blankenship
(74) *Attorney, Agent, or Firm* — Studebaker & Brackett PC

(57) ABSTRACT

A vehicle structure, comprising a front wheelhouse covering a front wheel, the front wheel comprising a rear face and a slant face which slants forward and inward from an inward end portion, in a vehicle width direction, of the rear face, a footrest, on which a passenger's foot is placed, the footrest being arranged near and on an inward side of the slant face of the front wheelhouse in a plan view of a vehicle, and a gusset connected to the rear face of the front wheelhouse and extending inward from a connection portion thereof to the rear face, wherein an inward end portion, in the vehicle width direction, of the gusset is arranged in the vicinity of a front-side portion of the footrest such that the footrest is restrained from moving forward by contacting the inward end portion of the gusset in a vehicle collision.

4 Claims, 6 Drawing Sheets

(56) References Cited

U.S. PATENT DOCUMENTS

2002/0096904 A1* 7/2002 Matsushita .................... 296/75
2003/0222478 A1* 12/2003 Akasaka et al. ......... 296/187.05
2008/0111397 A1* 5/2008 Yamada et al. .......... 296/193.09
2014/0001790 A1* 1/2014 Zischke et al. ........... 296/187.03
2014/0062130 A1* 3/2014 Yoshimura et al. ...... 296/187.08

* cited by examiner

Outward ←

Forward ←

VEHICLE STRUCTURE

BACKGROUND OF THE INVENTION

The present invention relates to a vehicle structure in which a footrest on which a driver's foot is placed is arranged near and on an inward side, in a vehicle width direction, of a slant face of a front wheelhouse in a plan view of a vehicle.

Conventionally, there has been a problem about a collision mode in which a collision load is directly inputted to the inside of a vehicle compartment from a vehicle side, without crushing of front side frames extending in a vehicle longitudinal direction at right-and-left both ends of a vehicle front portion, and a bumper reinforcement interconnecting respective front end portions of the right-and-left front side frames.

This collision mode is called a "small overlap collision", which may occur in a case in which the vehicle front portion collides with an obstacle having a small width in the vehicle width direction, such as a pole, at its one-side end portion.

The above-described small overlap collision has the following problem in a case in which a footrest on which a passenger's (driver's) foot is placed is arranged at an outward-side position, in the vehicle width direction, in a vehicle compartment which is located near and on an inward side, in the vehicle width direction, of a slant face of a front wheelhouse in a plan view of a vehicle, for example.

Specifically, in a case in which the impact load is inputted to the inside of the vehicle compartment from the vehicle side so that the footrest comes to move forward, it may be necessary to properly design vehicle structure, layout, fastening structure of members, and the like so that appropriate holding of the passenger's foot at the footrest can be ensured despite the above-described forward moving of the footrest. Consequently, there is a problem in that the vehicle weight may increase or the design flexibility may deteriorate. This problem is to be solved.

Meanwhile, Japanese Patent Laid-Open Publication No. 2006-82671 discloses a technology in which when a dash panel moves rearward in a vehicle frontal collision, a portion of a floor pad is allowed to move rearward so that a passenger's foot can be properly protected.

The technology disclosed in the above-described patent document, however, merely assumes the case in which the impact load is inputted from a vehicle front due to a head-on collision of the vehicle with the obstacle, this patent document discloses nothing about countermeasures against the case in which the collision load is directly inputted to the inside of the vehicle compartment from the vehicle side when the small overlap collision occurs.

SUMMARY OF THE INVENTION

An object of the present invention is to provide a vehicle structure which can properly hold a passenger's foot at the footrest, without increasing the vehicle weight or deteriorating the design flexibility, even in a case in which the small overlap collision, in which the collision load is directly inputted to the inside of the vehicle compartment from the vehicle side, occurs.

According to the present invention, there is provided a vehicle structure, comprising a front wheelhouse covering a front wheel, the front wheelhouse comprising a rear face and a slant face which slants forward and inward from an inward end portion, in a vehicle width direction, of the rear face, a footrest, on which a passenger's foot is placed, the footrest being arranged near and on an inward side of the slant face of the front wheelhouse in a plan view of a vehicle, and a gusset connected to the rear face of the front wheelhouse and extending inward from a connection portion thereof to the rear face, wherein an inward end portion, in the vehicle width direction, of the gusset is arranged in the vicinity of a front-side portion of the footrest such that the footrest is restrained from moving forward by contacting the inward end portion of the gusset in a vehicle collision.

According to the present invention, in the case in which the vehicle has the small overlap collision, the footrest comes to contact the inward end portion of the gusset, so that the footrest can be restrained from moving forward, without increasing the vehicle weight or deteriorating the design flexibility. Accordingly, the direction (position) of the foot can be controlled appropriately, so that the foot can be properly held at the footrest.

According to an embodiment of the present invention, the footrest is configured to extend upward and forward, and the inward end portion of the gusset is arranged in the vicinity of an upper portion of the front-side portion of the footrest such that the footrest is restrained from moving forward by contacting the upper portion of the inward end portion of the gusset in the vehicle collision. Thereby, the moving of a front end portion of the footrest can be effectively restrained by the inward end portion of the gusset in the small overlap collision. Accordingly, the effect that the foot is properly held at the footrest can be further promoted.

According to another embodiment of the present invention, a hinge pillar which has a closed cross section extending in a vehicle vertical direction is arranged on an outward side, in the vehicle width direction, of the front wheelhouse, the hinge pillar is connected to an outward end portion, in the vehicle width direction, of the front wheelhouse, and the gusset is connected to the hinge pillar and the front wheelhouse such that the gusset extends over a connection portion of the hinge pillar to the front wheelhouse. Thereby, the gusset is supported at the hinge pillar having the closed cross section extending in the vehicle vertical direction which is not relatively deformable. Accordingly, the moving of the gusset can be surely restrained even if the small overlap collision occurs, so that the effect that the foot is properly held at the footrest can be further promoted.

According to another embodiment of the present invention, the footrest has a recess portion which is recessed inward in the vehicle width direction, and the inward end portion of the gusset has a shape which matches the recess portion of the footrest. Thereby, when the footrest contacts the inward end portion of the gusset in the small overlap collision, the inward end portion of the gusset comes to engage with the recess portion of the footrest appropriately. Accordingly, the footrest can be surely restrained from moving forward.

Other features, aspects, and advantages of the present invention will become apparent from the following description which refers to the accompanying drawings.

DETAILED DESCRIPTION OF THE INVENTION

Figure 1:
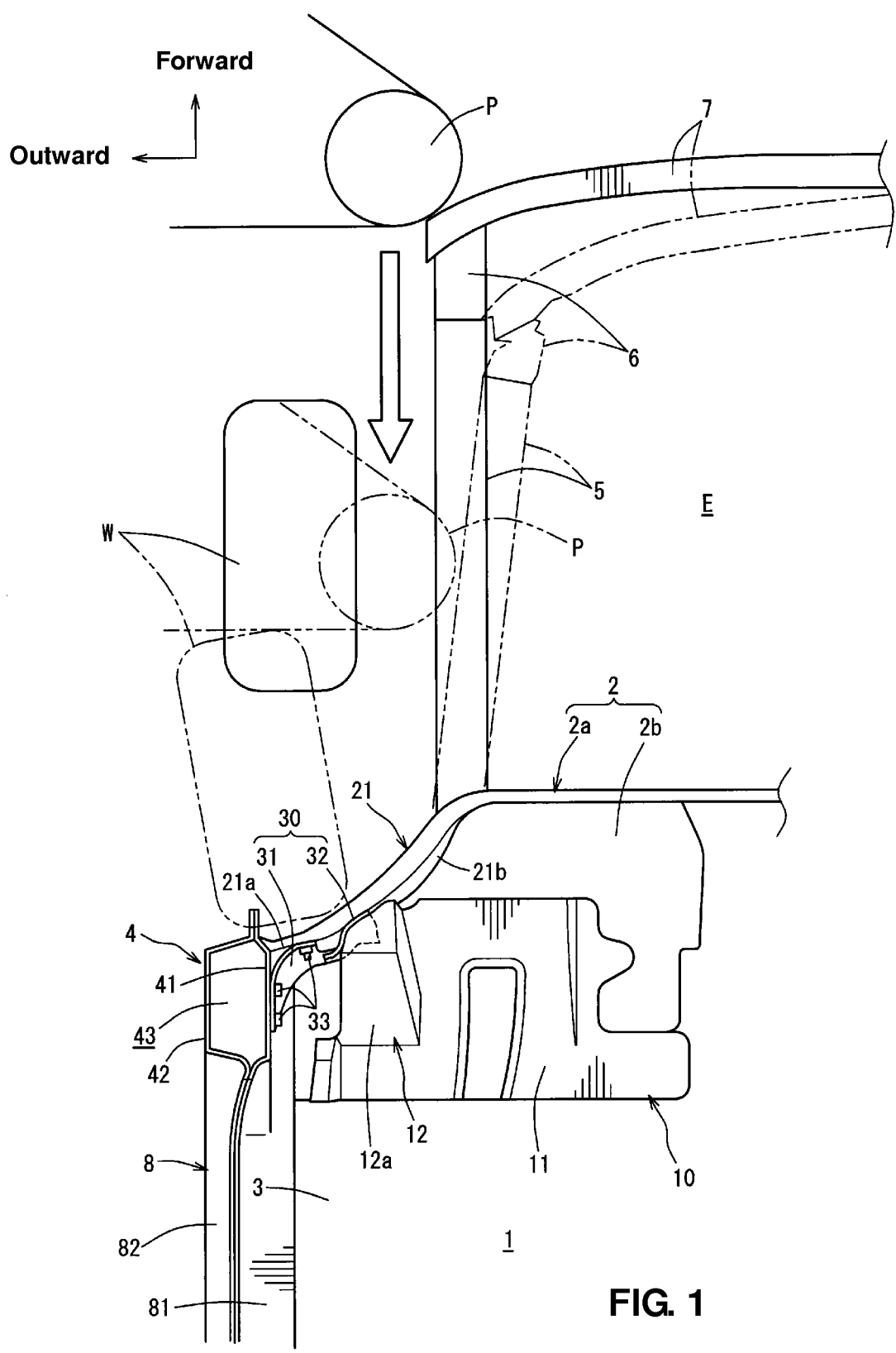
FIG. 1 is a plan view showing a vehicle structure according to an embodiment of the present invention.
Figure 3:
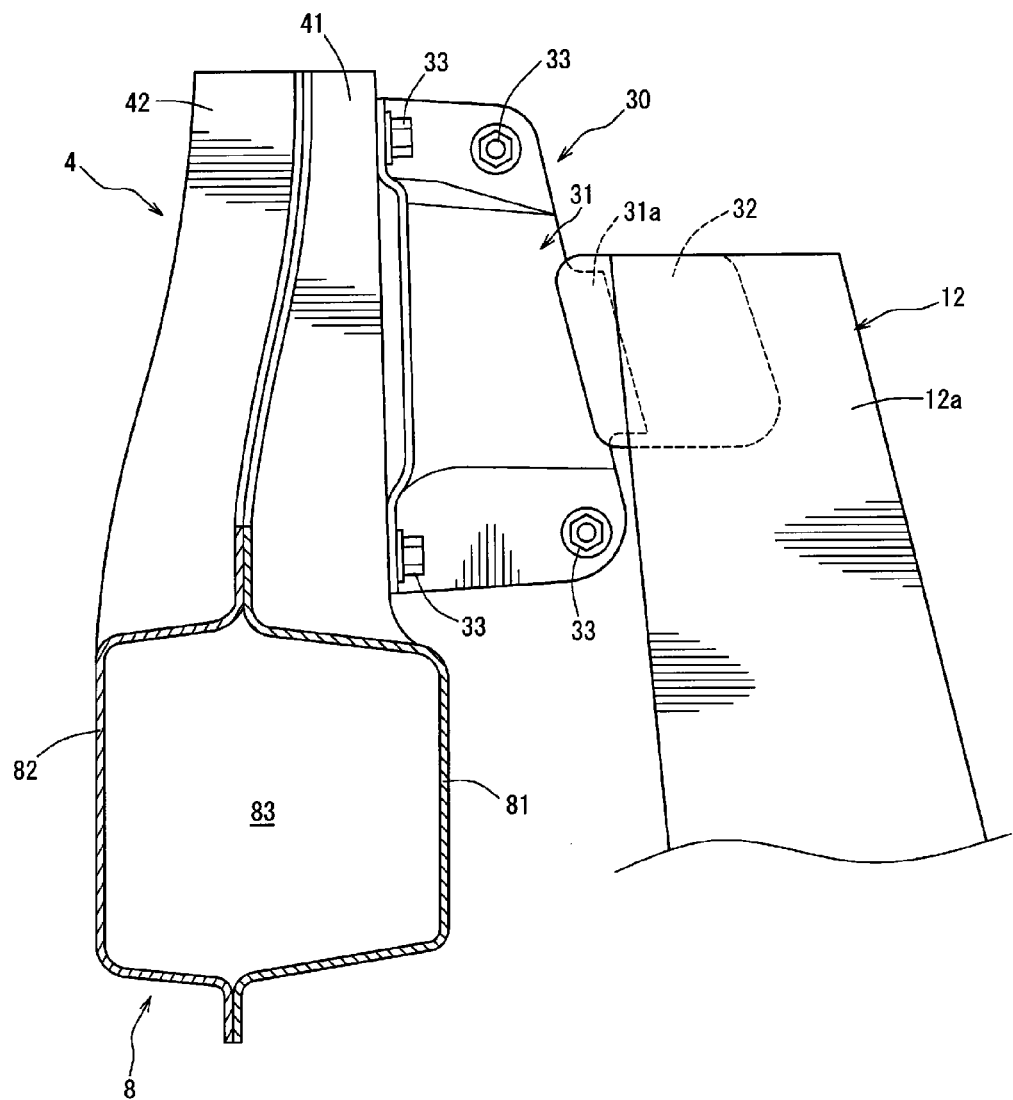
FIG. 3 is an elevation view of a gusset and its surrounding portion, when viewed from a vehicle rear.
Figure 4:
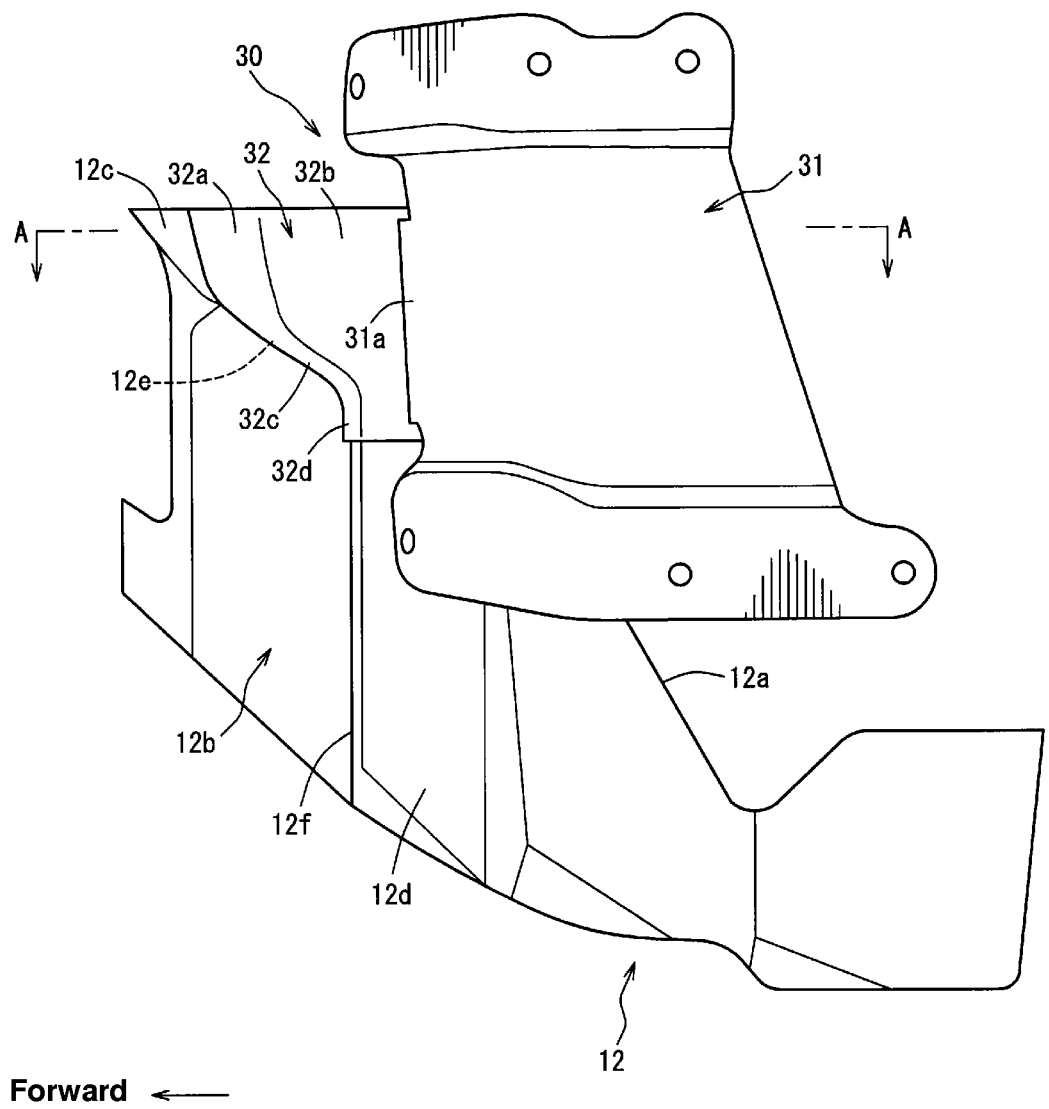
FIG. 4 is a side view of the gusset and a footrest, when viewed from a vehicle side.
Figure 5:
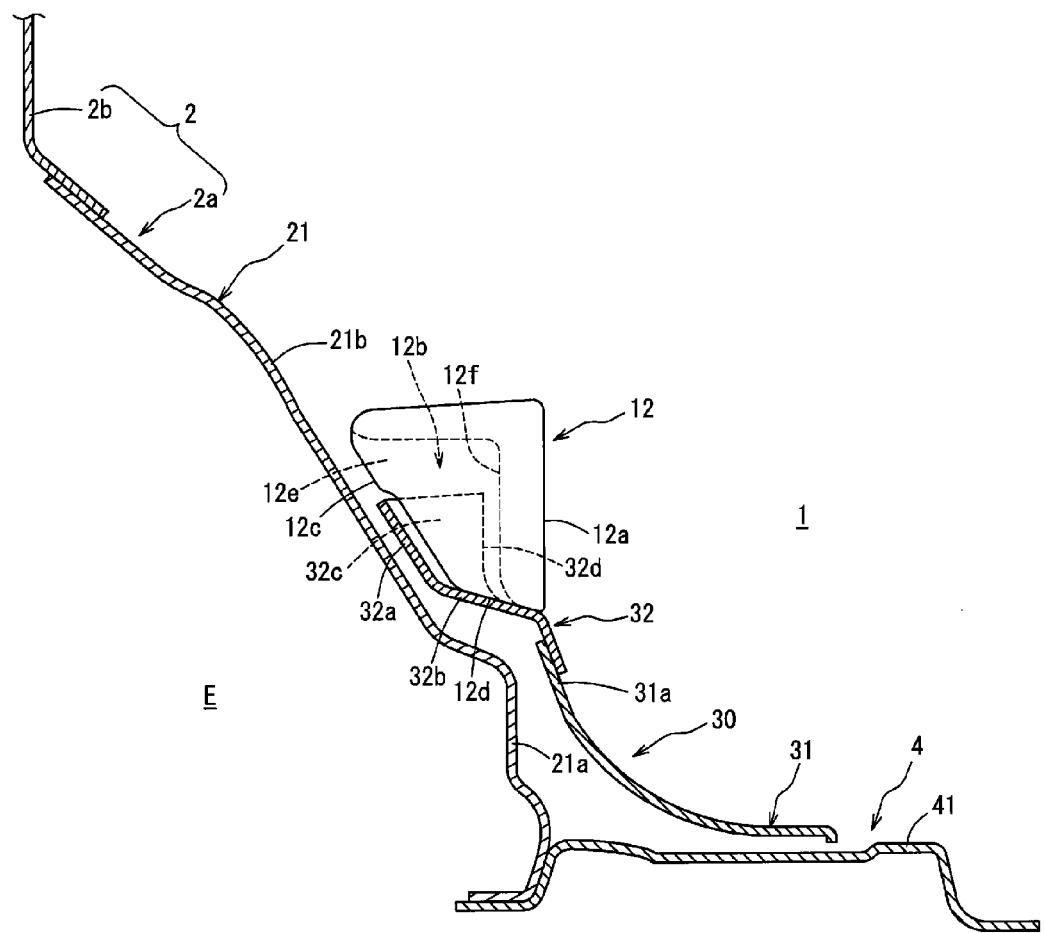
FIG. 5 is a sectional view taken along line A-A of FIG. 4.

Hereinafter, a preferred embodiment of the present invention will be described accompanying the drawings. FIG. 1 is a plan view showing a vehicle structure according to an embodiment of the present invention, FIG. 2 is a perspective view of the vehicle structure of FIG. 1, when viewed from a vehicle compartment, FIG. 3 is an elevation view of a gusset and its surrounding portion, when viewed from a vehicle rear, FIG. 4 is a side view of the gusset and a footrest, when viewed from a vehicle side, and FIG. 5 is a sectional view taken along line A-A of FIG. 4.

Figure 2:
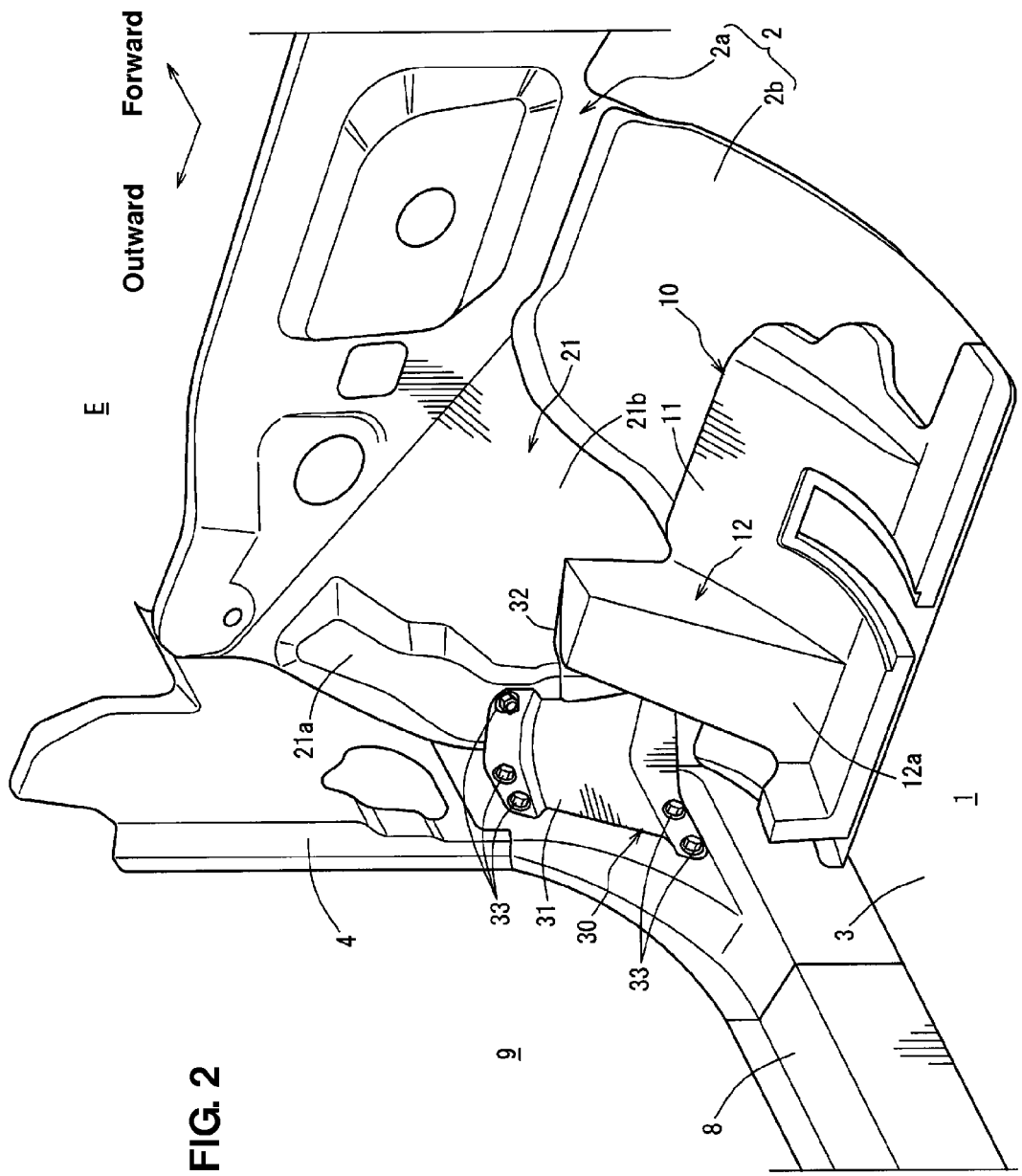
FIG. 2 is a perspective view of the vehicle structure of FIG. 1, when viewed from a vehicle compartment.

As shown in FIGS. 1 and 2, the vehicle according to the present embodiment comprises a dash panel 2 at its front portion, and an engine room E and a vehicle compartment 1 are partitioned from each other by the dash panel 2 which constitutes a front wall portion of the vehicle compartment 1.

The dash panel 2 is comprised of a dash panel upper 2a which extends vertically and a dash panel lower 2b which extends downward and rearward toward a floor panel 3 of the vehicle compartment from a lower end portion of the dash panel upper 2a.

Front wheelhouse portions 21 which cover front wheels W (see FIG. 2) of the vehicle are integrally formed at both end portions (a left-side end portion is illustrated only in FIGS. 1 and 2), in a vehicle width direction, of the dash panel upper 2a. The front wheelhouse portion 21 comprises a rear face 21a and a slant face 21b which slants forward and inward from an inward end portion, in the vehicle width direction, of the rear face 21a. The rear face 21a is joined to a hinge pillar 4 which will be described later.

Further, a pair of right-and-left front side frames 5 (a left-side end portion is illustrated only in FIG. 1) which extend forward from both side portions of the dash panel 2 are provided at right-and-left both ends of the front portion of the vehicle as shown in FIG. 1. Front end portions of the front side frames 5 are connected to a bumper reinforcement 7 via crash cans 6 as an impact absorbing member. The bumper reinforcement 7 extends in the vehicle width direction and interconnects the front end portions of the pair of right-and-left front side frames 5.

Also, at the front portion of the vehicle, as shown in FIGS. 1 through 3, are arranged the hinge pillars for front doors (not illustrated) 4 on the outward side, in the vehicle width direction, of the front wheelhouse portions 21. Front end portions of a pair of side sills 8 which extend in the vehicle longitudinal direction are connected to lower end portions of the hinge pillars 4. Side opening portions 9 are formed at vehicle side portions by the hinge pillars 4, the side sills 8, and so on.

The hinge pillar 4 primarily comprises, as shown in FIGS. 1 through 3, a hinge pillar inner 41 which has a U-shaped cross section and extends vertically at an inward-side position and a hinge pillar outer 42 which has a U-shaped cross section and extends vertically at an outward-side position. Respective longitudinal both end portions of the hinge pillar inner 41 and the hinge pillar outer 42 are joined together, so that a closed cross section 43 (see FIG. 1) which extends vertically is formed thereby. Since the hinge pillar 4 has the closed cross section 43 extending vertically, it has a relatively high rigidity, thereby properly supporting a door (not illustrated) so that the side opening portion 9 is opened or closed with the door.

Further, as shown in FIGS. 1 through 3, the side sill 8 is arranged on the outward side of the floor panel 3, and primarily comprises a side sill inner 81 which has a U-shaped cross section and extends in the vehicle longitudinal direction at an inward-side position and a side sill outer 82 which has a U-shaped cross section and extends in the vehicle longitudinal direction at an outward-side position. Respective upper and lower end portions of the side sill inner 81 and the side sill outer 82 are joined together, so that a closed cross section 83 (see FIG. 3) which extends in the vehicle longitudinal direction is formed thereby.

Herein, the vehicle according to the present embodiment has a driver's seat arranged on the left side of the vehicle, and a footrest member 10 shown in FIGS. 1 through 10 is arranged on the dash panel lower 2b on a driver's seat side. The footrest member 10 is made from resin foam, such as styrofoam, for example, and, as shown in FIGS. 1 through 5, comprised of a support base 11 which is placed and fixed onto the dash panel lower 2b and a footrest 12, where are formed integrally (in one piece). The present invention, however, is not limited to this structure in which the footrest member is made of resin foam and formed integrally.

The footrest 12 is arranged at an inward end portion (left-side end portion) of the support base 11, and arranged near and on an inward side of the slant face 21b of the front wheelhouse portion 21 in a plan view of the vehicle. The footrest 12 is configured to extend forward and upward, and constitutes a holding face 12a to hold a foot MF (see FIG. 5) of a passenger (driver) with a rear face thereof which faces the driver.

Further, a gusset 30 is arranged in a corner of the vehicle compartment 1 which is formed by joining of the rear face 21a of the front wheelhouse portion 21 and the hinge pillar 4. The gusset 30, which is made from metal, is comprised of two members of a gusset body 31 which is of an L shape in the plan view and an extension portion 32 which is joined to a front end portion (an inward end portion in the vehicle width direction) of the gusset body 31.

The gusset body 31 is fastened to the hinge pillar 4 and the rear face 21a of the front wheelhouse portion 21 at its rear end portion (its outward end portion in the vehicle width direction) and upper and lower portions of its front end by using fastening members 33, such as bolts and nuts. Thus, the gusset body 31 is fastened to the hinge pillar 4 and the front wheelhouse portion 21 such that the gusset body 31 extends over a connection portion of the hinge pillar 4 to the front wheelhouse portion 21.

Further, the gusset body 31 has a flange portion 31a at its front end portion, and the above-described extension portion 32 is joined to this flange portion 31a. The extension portion 32 extends inward beyond a fastening portion of the gusset body 31 to the rear face 21a of the front wheelhouse portion 21, which constitutes an inward end portion, in the vehicle width direction, of the gusset 30. The extension portion 32 is arranged in the vicinity of an upper portion of a front-side portion of said footrest 12.

Herein, the footrest 12 has a recess portion 12b which is recessed inward in the vehicle width direction at its front-side portion as shown in FIGS. 4 and 5. The above-described extension portion 32 has a shape which matches the recess portion 12b of the footrest 12, and comprises upper front face 32a and side face portion 32b which respectively face front end upper portion 12c and outward end portion 12d of the footrest 12, a bottom face 32c which faces an upper face 12e of the recess portion 12b, and a lower front face 32d which faces a rear face 12f of the recess portion 12b.

Figure 6:
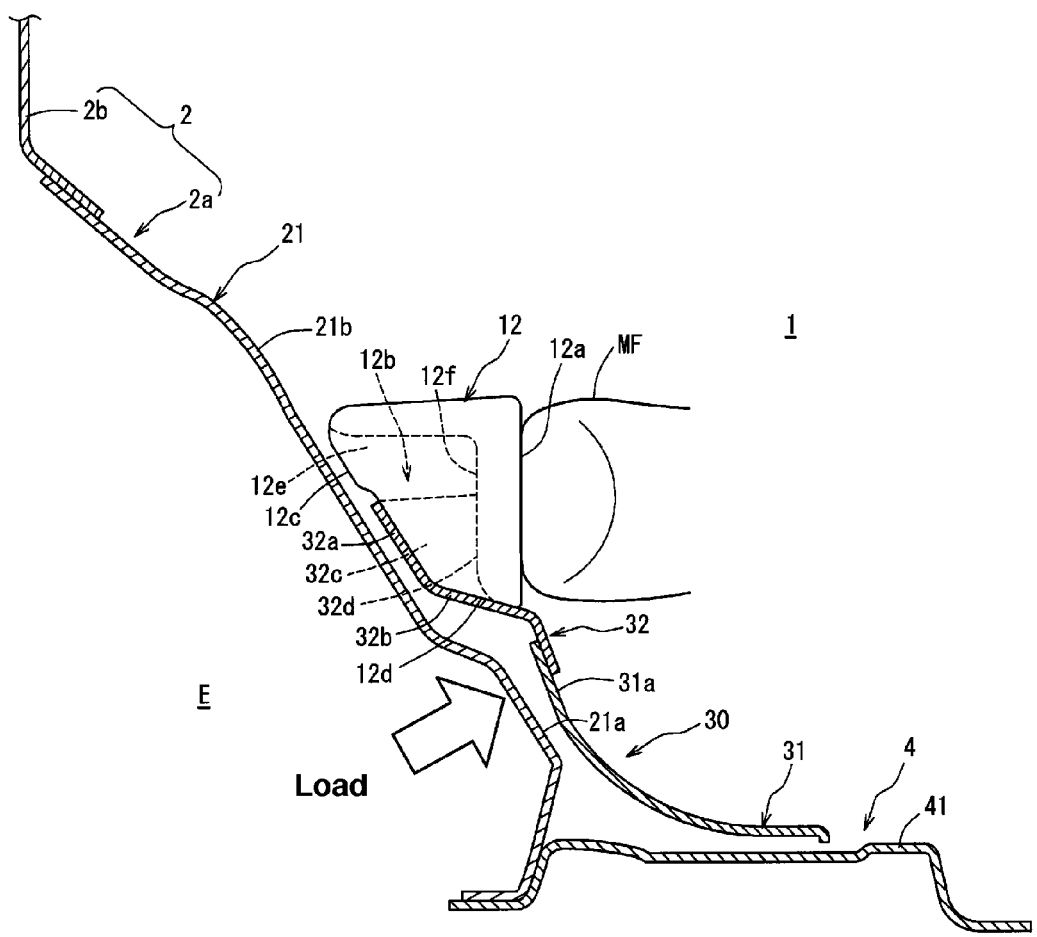
FIG. 6 is a sectional view explaining a state in which a small overlap collision occurs.

Hereinafter, the case in which the vehicle according to the present embodiment has the small overlap collision will be described referring to FIGS. 1 and 6. FIG. 1 shows the case in which the front portion of the vehicle collides with a pole P of an obstacle having a small width in the vehicle width direction at its left-side portion, for example.

In FIG. 1, the pole P contacts a left-side end portion of the bumper reinforcement 7, and, as shown by two-dotted broken lines in the figure, the pole P comes into the vehicle compartment, letting a front wheel W move rearward. In this case, the crash can 6 has a compressive deformation as shown by the two-dotted broken line, so that part of the collision load is absorbed. However, the front side frame 5 and the bumper reinforcement 7 do not crush, and the impact load is directly inputted to the inside of the vehicle compartment from the vehicle side. Accordingly, the inputted impact load causes the front wheelhouse portion 21 to deform toward the vehicle compartment 1 as shown in FIG. 6.

In this case, as the footrest 12 deforms forward, it comes to contact the extension portion 32 of the gusset 30 so as to be restrained from moving forward. In the state shown in FIG. 6, the front end upper portion 12c and the outward end portion 12d of the footrest 12, and the upper face 12e and rear face 12f of the recess portion 12b contact the upper front face 32a, the side face portion 32b, the bottom face 32c, and the lower front face 32d of the extension portion 32, respectively. Thereby, the footrest 12 can be surely restrained from moving forward.

Thus, the forward move of the footrest 12 is restrained by its contact with the extension portion 32 of the gusset 30, so that the direction (position) of the foot MF is appropriately controlled.

According to the present embodiment, as described above, since the extension portion 32 which constitutes the inward end portion, in the vehicle width direction, of the gusset 30 is arranged in the vicinity of the front-side portion of the footrest 12 such that the footrest 12 is restrained from moving forward by contacting the extension portion 32 in the small overlap collision of the vehicle, the footrest 12 can be restrained from moving forward, without increasing the vehicle weight or deteriorating the design flexibility. Accordingly, the direction (position) of the foot MF can be controlled appropriately, so that the foot MF can be properly held at the footrest 12.

Herein, in the present embodiment, the recess portion 12b is formed at a portion of the footrest 12, and the extension portion 32 of the gusset 30 has the shape which matches the recess portion 12b of the footrest 12. Thereby, when the footrest 12 contacts the extension portion 32 of the gusset 30 in the small overlap collision, the extension portion 32 of the gusset 30 comes to engage with the recess portion 12b of the footrest 12 appropriately. Accordingly, the footrest 12 can be surely restrained from moving forward.

Also, since the footrest member 10 is made from resin foam according to the present embodiment, when the both contact each other in the small overlap collision, the collision load can cause the extension portion 32 to engage with the footrest 12. Thereby, the forward moving of the footrest 12 can be more surely restrained.

Further, since the footrest 12 is configured to extend upward and forward, and the extension portion 32 is arranged in the vicinity of the upper portion of the front-side portion of the footrest 12 such that the footrest 12 is restrained from moving forward by contacting the upper portion of the extension portion 32 in the vehicle collision. Thereby, the moving of the front end portion of the footrest 12 can be effectively restrained by the extension portion 32 of the gusset 30 in the small overlap collision. Accordingly, the effect that the foot MF is properly held at the footrest 12 can be further promoted.

Moreover, since the gusset 30 (the gusset body 31) is connected to the hinge pillar 4 and the front wheelhouse portion 21 such that the gusset 30 extends over the connection portion of the hinge pillar 4 to the front wheelhouse portion 21, the gusset 30 is supported at the hinge pillar 4 having the closed cross section extending in the vehicle vertical direction which is not relatively deformable. Accordingly, the moving of the gusset 30 can be surely restrained even if the small overlap collision occurs, so that the effect that the foot MF is properly held at the footrest 12 can be further promoted.

Herein, while the above-described embodiment describes the case in which the left-side portion of the vehicle front portion collides with the pole P as the exemplified obstacle having the small width in the vehicle width direction, this obstacle should not be limited to this pole P. For example, a separation belt at the center of a vehicle road, an end portion of a guardrail, a block fence, or the like may be applied as the above-described obstacle having the small width in the vehicle width direction.

The gusset of the present invention corresponds to the gusset 30 comprising the gusset body 31 and the extension portion 32 of the present embodiment. Likewise, the inward end portion of the gusset corresponds to the extension portion 32. However, the present invention should not be limited to the above-described embodiment. For example, the gusset body 31 and the extension portion 32 may be made of a sheet of panel.

What is claimed is:

1. A vehicle structure, comprising:
a front wheelhouse covering a front wheel, the front wheelhouse comprising a rear face and a slant face which slants forward and inward from an inward end portion, in a vehicle width direction, of the rear face;
a footrest, on which a passenger's foot is placed, the footrest being arranged near and on an inward side of the slant face of the front wheelhouse in a plan view of a vehicle; and
a gusset connected to the rear face of the front wheelhouse and extending inward from a connection portion thereof to the rear face,
wherein an inward end portion, in the vehicle width direction, of said gusset is arranged in a vicinity of a front-side portion of said footrest such that the footrest is restrained from moving forward by contacting the inward end portion of the gusset in a vehicle collision, and
said footrest has a recess portion which is recessed inward in the vehicle width direction, and the inward end portion of said gusset has a shape which matches said recess portion of the footrest.

2. The vehicle structure of claim 1, wherein said footrest is configured to extend upward and forward, and said inward end portion of the gusset is arranged in the vicinity of an upper portion of the front-side portion of the footrest such that the footrest is restrained from moving forward by contacting the upper portion of the inward end portion of the gusset in the vehicle collision.

3. The vehicle structure of claim 2, wherein a hinge pillar which has a closed cross section extending in a vehicle vertical direction is arranged on an outward side, in the vehicle width direction, of said front wheelhouse, said hinge pillar is connected to an outward end portion, in the vehicle width direction, of the front wheelhouse, and said gusset is connected to the hinge pillar and the front wheelhouse such that the gusset extends over a connection portion of the hinge pillar to the front wheelhouse.

4. The vehicle structure of claim 1, wherein a hinge pillar which has a closed cross section extending in a vehicle vertical direction is arranged on an outward side, in the vehicle width direction, of said front wheelhouse, said hinge pillar is connected to an outward end portion, in the vehicle width direction, of the front wheelhouse, and said gusset is connected to the hinge pillar and the front wheelhouse such that the gusset extends over a connection portion of the hinge pillar to the front wheelhouse.

* * * * *